(No Model.)  2 Sheets—Sheet 1.
W. B. ROBERTS.
CULTIVATOR.
No. 398,654.  Patented Feb. 26, 1889.
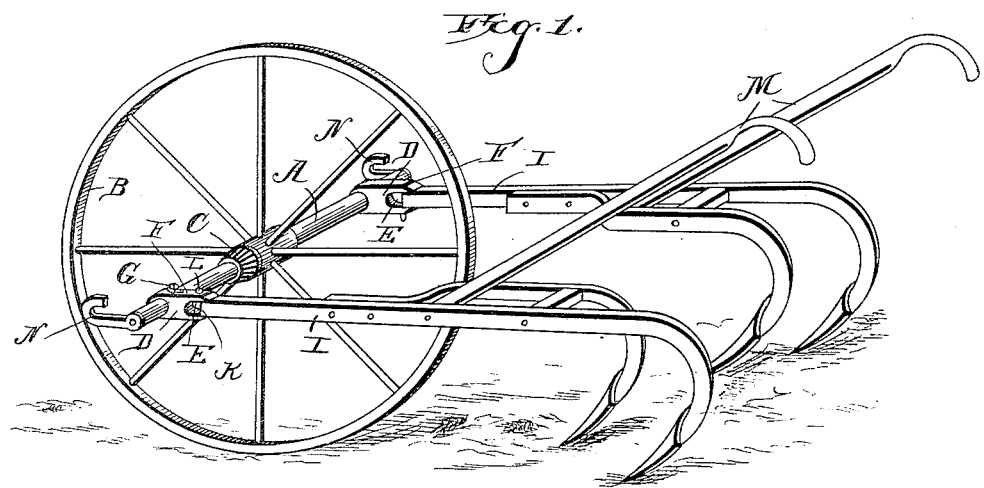
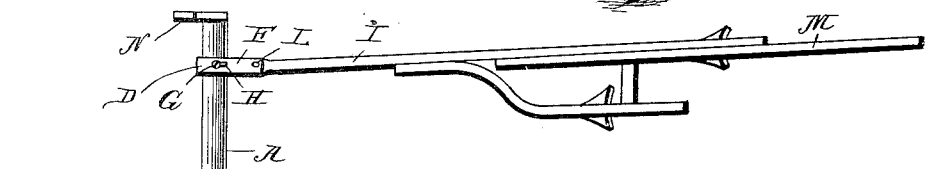
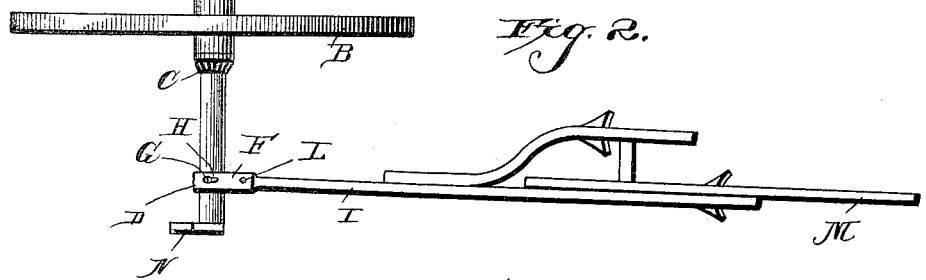
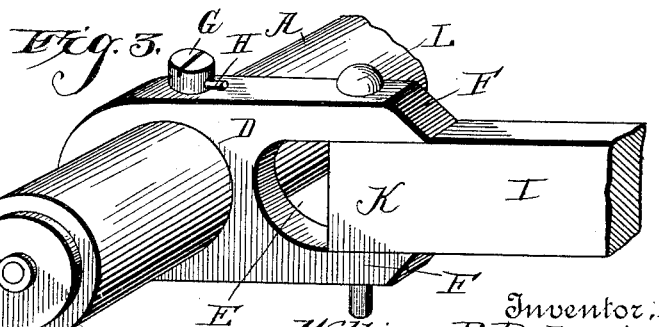
Witnesses.
Henry G. Dieterich
E. G. Siggers
Inventor,
William B. Roberts
By his Attorneys (No Model.) 2 Sheets—Sheet 2.
W. B. ROBERTS.
CULTIVATOR.
No. 398,654. Patented Feb. 26, 1889.
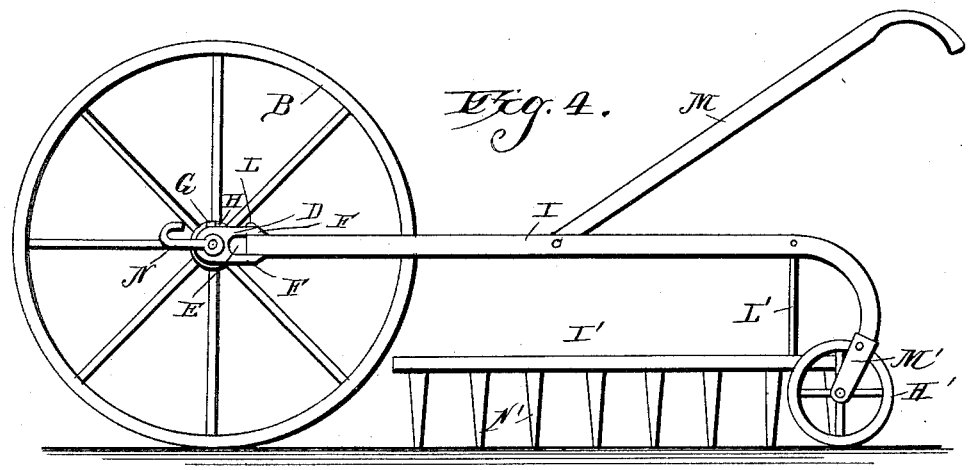
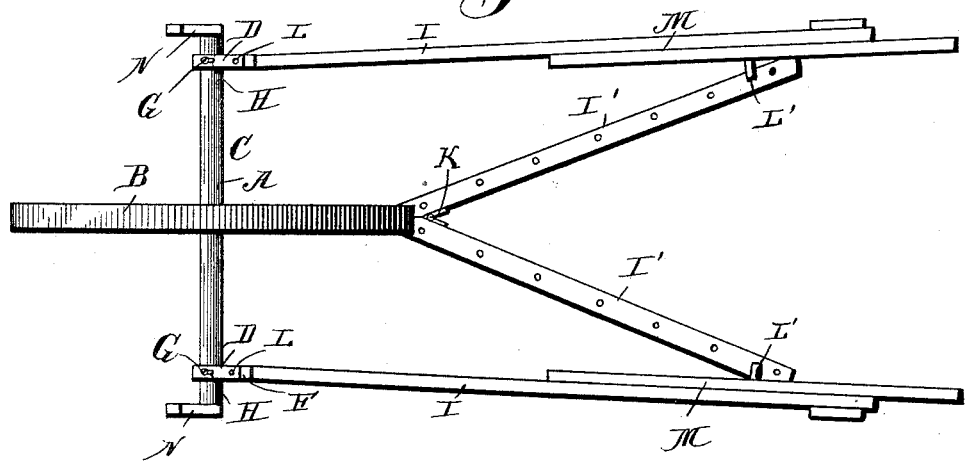
Witnesses,
Henry G. Dieterich
Inventor,
William B. Roberts,
By his Attorneys
N. PETERS, Photo-Lithographer, Washington, D. C.

UNITED STATES PATENT OFFICE.

WILLIAM B. ROBERTS, OF INDIANAPOLIS, INDIANA.

CULTIVATOR.

SPECIFICATION forming part of Letters Patent No. 398,654, dated February 26, 1889.

Application filed April 28, 1888. Serial No. 272,154. (No model.)

*To all whom it may concern:*

Be it known that I, WILLIAM B. ROBERTS, a citizen of the United States, residing at Indianapolis, in the county of Marion and State of Indiana, have invented a new and useful Improvement in Cultivators, of which the following is a specification.

My invention relates to an improvement in cultivators; and it consists in the peculiar construction and combination of devices that will be more fully set forth hereinafter, and particularly pointed out in the claims.

In the accompanying drawings, Figure 1 is a perspective view of a cultivator embodying my improvements. Fig. 2 is a top plan view. Fig. 3 is a detailed perspective view showing the coupling between one of the beams and the axle. Figure 4 is a side elevation of my invention when arranged as a harrow. Fig. 5 is a top plan view of the same.

A represents an axle, to the center of which is journaled a supporting-wheel, B.

D represents a pair of clevises, which are attached to the axle at suitable distances from the ends thereof and project rearwardly therefrom. The said clevises have openings E formed in their rear sides, and are thereby provided with rearwardly-extending arms F, which are arranged one above the other. Each clevis is rigidly secured to the axle by means of a set-screw, G, and the said screws are prevented from turning after having been adjusted by means of keys H.

I represents a pair of cultivator-beams, which are provided with any suitable variety of plows or shovels. Each cultivator-beam has a vertical eye, K, at its front end. The front ends of the cultivator-beams are inserted in the openings E in the rear sides of the clevises, and vertical bolts L are passed downward through aligned openings in the arms F, and serve to pivot the front ends of the beams to the clevises, so that the cultivators are adapted to be moved laterally independently of each other. Each cultivator-beam is provided with a handle, M, adapted to be grasped by the plowman.

To the ends of the axle are attached hooks N, adapted for the attachment of the traces of the draft-animal. When thus arranged, my invention constitutes a cultivator for growing crops, and the beams, being independently connected to the axle and provided with independent handles, are adapted to be directed by the plowman, so as to cause the cultivating teeth or shovels to run as near the growing plants as may be desirable.

In Figs. 4 and 5 I illustrate my invention when adapted for use as a vibrating harrow. A pair of harrow-beams, I', have their rear ends attached to the depending rear portions of the cultivator-beams by the links L', and have their front ends connected together by means of a hinge, K, thereby adapting the harrow-beams to vibrate laterally with the cultivator-beams.

Inasmuch as the beams I are pivotally connected to the axle A, and as the harrow-beams are flexibly connected to the beams I and are pivoted together, it follows that the harrow is rendered capable of lateral vibration or adjustment, and thereby the same is adapted to be narrowed or widened to correspond with the width of the space between the rows of plants to be cultivated. When the harrow-beams I' are thus connected to the cultivator-beams, the cultivating teeth or shovels are removed from the latter, and supporting-wheels H', having standards or feet M', are substituted in lieu of the cultivating-teeth, the function of the said wheels being to support the rear ends of the cultivator-beams, as will be readily understood. The harrow-beams I' are provided with suitable harrow-teeth, N'.

This application embodies an improvement upon my patent, No. 383,076, and the supporting-wheel B, described herein, is provided at its hub with a gear-wheel, C, adapted to operate the planting mechanism described in my said before-mentioned application for Letters Patent.

Having thus described my invention, I claim—

1. The combination of the axle, the supporting-wheels thereon, the clevises secured to the axle, the laterally-adjustable beams having their front ends pivotally connected to the clevises, and the harrow-beams having their front ends flexibly connected together, the said beams being also connected to the cultivator-beams, substantially as described.

2. The combination of the axle, the cultivator-beams pivotally connected thereto and arranged on each side, and the harrow-beams arranged within the cultivator-beams and connected thereto and also connected together.

3. In combination with the axle, the cultivator-beams having a hinged or pivotal connection therewith, the harrow-beams I', arranged between the cultivator-beams, said harrow-beams being hinged together at K, and having the links L', connecting the harrow-beams with the cultivator-beams, as set forth.

In testimony that I claim the foregoing as my own I have hereto affixed my signature in presence of two witnesses.

WILLIAM B. ROBERTS.

Witnesses:
JOHN A. HOFFMAN,
FLORENCE J. WILLIAMS.